O. HOFFMANN & C. WOLTER.
PORTABLE LANTERN.
APPLICATION FILED SEPT. 8, 1916.
1,274,713.
Patented Aug. 6, 1918.
2 SHEETS—SHEET 1.
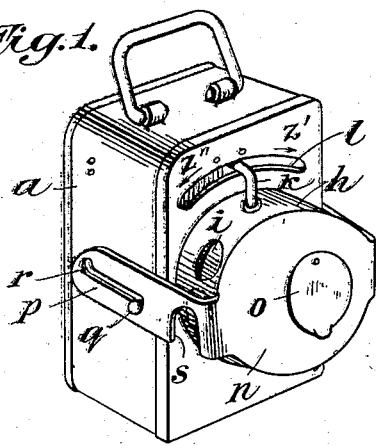
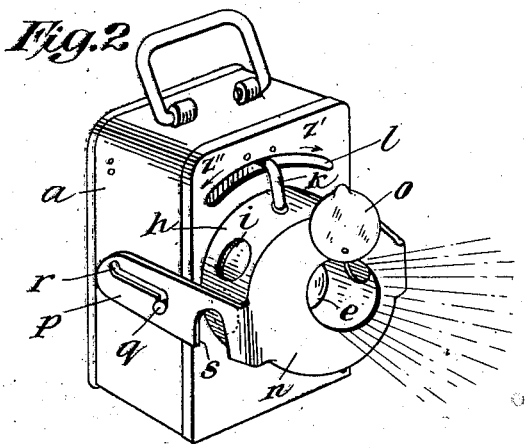
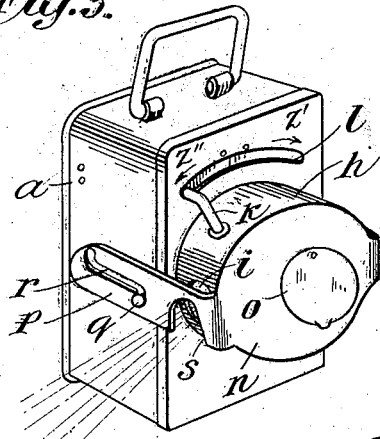
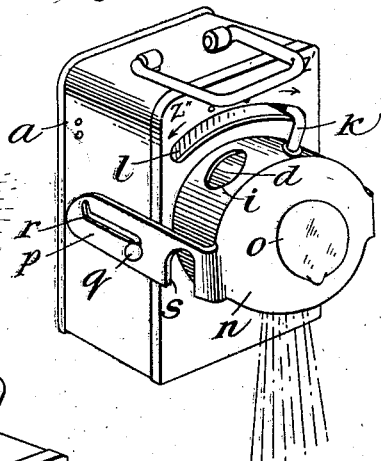
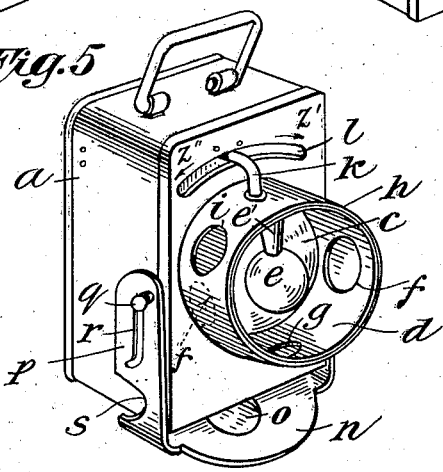
Inventors
O. Hoffmann and C. Wolter
By their Attorney
Lindley Murray O. HOFFMANN & C. WOLTER.
PORTABLE LANTERN.
APPLICATION FILED SEPT. 8, 1916.
1,274,713.
Patented Aug. 6, 1918.
2 SHEETS—SHEET 2.
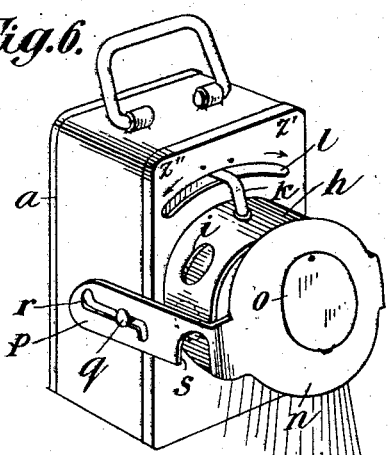
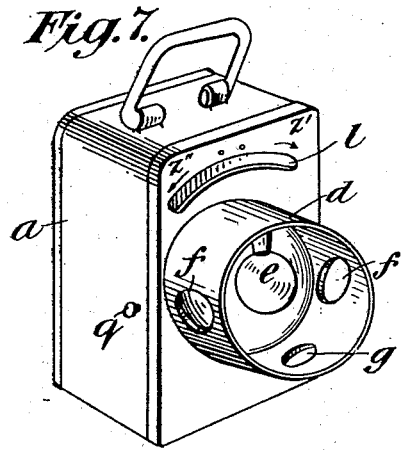
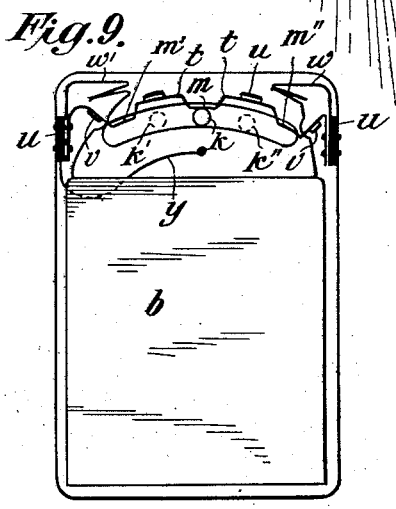
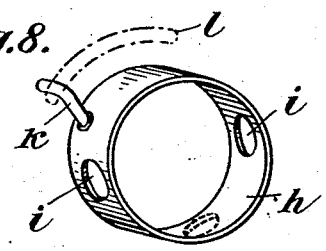
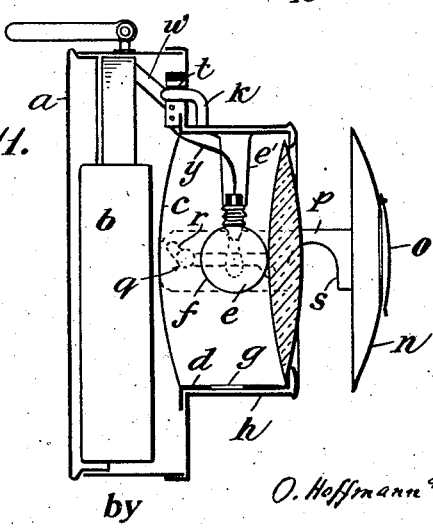
Inventor:
O. Hoffmann and C. Wolter
by Lindley J Murray Atty.

UNITED STATES PATENT OFFICE.

OSCAR HOFFMANN AND CARL WOLTER, OF STUTTGART, GERMANY.

PORTABLE LANTERN.

1,274,713.  Specification of Letters Patent.  Patented Aug. 6, 1918.

Application filed September 8, 1916. Serial No. 119,114.

*To all whom it may concern:*

Be it known that we, OSCAR HOFFMANN, a resident of Stuttgart, Germany, and CARL WOLTER, a resident of Stuttgart, Germany, have made an invention of certain new and useful Improvements in Portable Lanterns; and we do hereby declare that the following is a full, clear, and exact description of the same.

Our invention relates to portable lanterns or lamps and more particularly to a portable lantern provided with an electric source of light such as a dry storage cell and a glow lamp to be connected with it. The object of our invention is a lantern permitting the rays of light to be projected either in a forward direction or to the sides or the ground, as needs be.

In order to attain this result, the lantern according to our invention carries a tubular projection inclosing the source of light proper and having openings arranged on its circumference. A tubular shutter is rotatably disposed on this projection, openings in the walls of the shutter coinciding with the openings of the projection, when the tube is turned one way or the other. The tube may be removed altogether from the projection; its front aperture is adapted also to be closed at will.

In order to secure an easy and reliable adjustment of the lantern, an arm is arranged on the tube, said arm being adapted to coöperate with stops arranged on the lantern casing, the stops at both sides of the casing being rigid, while a third stop in the middle is resilient. When the arm is in contact with the middle stop, all the apertures of the lantern are closed; when it touches the stop disposed on one side, the bottom aperture is opened, and whenever it is in contact with the stop on the other side, the side openings are uncovered.

In order to render the cutting in and out of the source of light sure and easy and to protect the dry cell, the arm on the tube is preferably constructed to act as an electric contact adapted to coöperate, in its middle and end positions, with electric contacts arranged on the casing and thus to close the lamp circuit.

In the drawings affixed to this specification and forming part thereof the preferred form of a portable lantern according to our invention is represented.

Figure 1 shows the lantern with all its apertures closed,

Fig. 2 is another view showing the front aperture opened;

Fig. 3 shows the position of parts when the side apertures are open; in

Fig. 4 the bottom aperture alone is shown to be open.

Fig. 5 shows the lantern with the front shutter lowered.

Fig. 6 is a view of the lantern showing the front shutter in a half open position so as to throw rays of light to the ground.

Fig. 7 shows the lantern with the tubular shutter and the front shutter removed.

Fig. 8 is a view of the tubular shutter, and

Fig. 9 is an inner view of the lantern casing with the back removed.

Fig. 10 shows the electric contacts, and

Fig. 11 is a vertical cross-section of the lantern as a whole.

Referring to the drawings $a$ is the lantern casing, $b$ is a dry cell inclosed in it, $c$ is a reflector, $d$ is the tubular projection carrying the glow lamp $e$ arranged in its axis by means of a tube $e'$ so as to emit uniform and powerful rays of light backward to the reflector, forward, sidewise and to the ground.

Sidewise of and below the lamp side-openings $f$ and a bottom opening $g$ are arranged in the tubular projection $d$. $h$ is the tubular shutter rotatably disposed on said projection and presenting two diametrically opposite openings $i$ of substantially the size of the openings $f$ and adapted to be brought in front of said openings by turning tube $h$.

Shutter $h$ carries a curved arm $k$ loosely engaging in a slot $l$ of quadrant form, arranged in the casing $a$. Arm $k$ is disposed at an angle of about 45° with regard to a chord supposed to connect the centers of the openings $i$.

Near the middle part of slot $l$ a resilient stop is arranged within the casing, said stop offering a certain resistance to the movement of arm $k$ without however hindering it altogether. This stop has the form of a resilient contact piece $m$ forming part of a metal strip $t$ fastened to the front wall of the casing, concentrically to slot $l$, by aid of insulating pieces u. Strip t further presents two more contacts m', m'' located above slot l.

Strip t is connected, by aid of a wire w, to the storage cell b. Arm k is electrically connected to tube e' by aid of shutter h and tube d. The lamp contact wire y is connected to storage cell b by means of wire w'.

A front shutter n carrying a small auxiliary shutter o serves to cover the front opening of the lantern. Shutter n is carried by arms p provided with slots r embracing pins q arranged on the sides of the casing. In order to prevent the arms from obstructing the path of the light rays emitted sidewise, indentures s of a suitable form are arranged on them.

The lantern described operates as follows:

In the position of parts shown in Fig. 1 arm k is in contact with the central contact piece m and the lamp is therefore connected to the storage cell. However, as all the shutters are closed, front shutter n covering tube d, auxiliary shutter o covering the front opening of shutter n and the openings f and g being equally covered, no light can escape to the outside.

If it is desired to send a narrow bundle of light rays in a forward direction, the auxiliary shutter o is lifted (Fig. 2). If all the light available shall escape in a forward direction, shutter n is first pulled forward and is then lowered into the position shown in Fig. 5.

In order to throw the lamp out of circuit, the shutter h need only be turned a little to the right or left. Arm k is then carried into either one of the positions k' or k'' (Fig. 10) and is disconnected.

In order to send rays of light to the side the shutter h is turned in the direction of the arrow Z'', until arm k meets contact m''. The openings f and i coincide in this position and at the same time the lamp circuit is closed.

The sending of rays in a downward direction may also be effected by lifting shutter n a little (Fig. 6). As the shutter is highly polished on its inner face, a bundle of light rays is thrown to the ground.

We wish it to be understood that our invention is not limited by or restricted to the particular form of a lantern shown in the drawings which is merely meant to be an example of a handy device in accordance with our invention.

We claim:—

1. In a portable electric lantern in combination, a casing, a tubular projection on the front wall of said casing, an electric lamp in said tubular projection, means for feeding said lamp with electricity, a reflector behind said lamp, openings in said tubular projection allowing the lamp to optionally send bundles of rays not only to the rear upon the reflector, but also in a forward and sidewise direction and to the ground, and a tubular shutter arranged on said tubular projection and adapted to simultaneously close both the side and bottom openings of said projection.

2. In a portable electric lantern in combination, a casing, a tubular projection on the front wall of said casing, an electric lamp in said tubular projection, means for feeding said lamp with electricity, a reflector behind said lamp, openings in said tubular projection allowing the lamp to optionally send bundles of rays not only to the rear upon the reflector, but also in a forward and sidewise direction and to the ground, a tubular shutter arranged on said tubular projection and adapted to simultaneously close both the side and bottom openings of said projection and a front shutter adapted to fully or partly close the front opening of said projection.

3. In a portable electric lantern in combination, a casing, a tubular projection on the front wall of said casing, an electric lamp in said tubular projection, means for feeding said lamp with electricity, a reflector behind said lamp, openings in said tubular projection allowing the lamp to optionally send bundles of rays not only to the rear upon the reflector, but also in a forward and sidewise direction and to the ground, a tubular shutter arranged on said tubular projection and adapted to simultaneously close both the side and bottom openings of said projection, a front shutter adapted to fully or partly close the front opening of said projection, a central opening in said front shutter and an auxiliary shutter pivoted to said front shutter and adapted to close the said central opening.

4. In a portable electric lantern in combination, a casing, a tubular projection on the front wall of said casing, an electric lamp in said tubular projection, means for feeding said lamp with electricity, a reflector behind said lamp, openings in said tubular projection allowing the lamp to optionally send bundles of rays not only to the rear upon the reflector, but also in a forward and sidewise direction and to the ground, a tubular shutter arranged on said tubular projection and adapted to simultaneously close both the side and bottom openings of said projection and a plurality of stops adapted to limit the movement of rotation of said tubular shutter.

5. In a portable electric lantern in combination, a casing, a tubular projection on the front wall of said casing, an electric lamp in said tubular projection, means for feeding said lamp with electricity, a reflector behind said lamp, openings in said tubular projection allowing the lamp to optionally send bundles of rays not only to the rear upon the reflector, but also in a forward and sidewise direction and to the ground, a tubular shutter arranged on said tubular projection and adapted to simultaneously close both the side and bottom openings of said projection and three stops on the casing adapted to limit the movement of rotation of said tubular shutter, the middle one of said stops being resilient.

6. In a portable electric lantern in combination, a casing, a tubular projection on the front wall of said casing, an electric lamp in said tubular projection, means for feeding said lamp with electricity, a reflector behind said lamp, openings in said tubular projection allowing the lamp to optionally send bundles of rays not only to the rear upon the reflector, but also in a forward and sidewise direction and to the ground, a tubular shutter arranged on said tubular projection and adapted to simultaneously close both the side and bottom openings of said projection and a plurality of stops adapted to limit the movement of rotation of said tubular shutter, one of said stops being adapted to close the lamp circuit.

7. In a portable electric lantern in combination, a casing, a tubular projection on the front wall of said casing, an electric lamp in said tubular projection, means for feeding said lamp with electricity, a reflector behind said lamp, openings in said tubular projection allowing the lamp to optionally send bundles of rays not only to the rear upon the reflector, but also in a forward and sidewise direction and to the ground, a tubular shutter arranged on said tubular projection and adapted to simultaneously close both the side and bottom openings of said projection, a contact arm on said tubular shutter and three stops on the casing adapted to limit the movement of rotation of said tubular shutter, one of said stops being adapted to coöperate with said contact arm to close the lamp circuit.

8. In a portable electric lantern in combination, a casing, a tubular projection on the front wall of said casing, an electric lamp in said tubular projection, means for feeding said lamp with electricity, a reflector behind said lamp, openings in said tubular projection allowing the lamp to optionally send bundles of rays not only to the rear upon the reflector, but also in a forward and sidewise direction and to the ground, a tubular shutter arranged on said tubular projection and adapted to simultaneously close both the side and bottom openings of said projection, a front shutter adapted to fully or partly close the front opening of said projection, arms on said shutter in gear with said casing and means for longitudinally displacing said arms relatively to said casing.

9. In a portable electric lantern in combination, a casing, a tubular projection on the front wall of said casing, an electric lamp in said tubular projection, means for feeding said lamp with electricity, a reflector behind said lamp, openings in said tubular projection allowing the lamp to optionally send bundles of rays not only to the rear upon the reflector, but also in a forward and sidewise direction and to the ground, a tubular shutter arranged on said tubular projection and adapted to simultaneously close both the side and bottom openings of said projection, a front shutter adapted to fully or partly close the front opening of said projection, arms on said shutter in gear with said casing, means for longitudinally displacing said arms relatively to said casing and indentures on said arms in front of the side openings of said tubular projection.

In testimony whereof we have signed our names to this specification in the presence of two subscribing witnesses.

OSCAR HOFFMANN.
CARL WOLTER.

Witnesses:
ROSA THALBAUER,
PAULINE MÜLLER.